United States Patent [19]
Friedel

[11] Patent Number: 5,197,885
[45] Date of Patent: * Mar. 30, 1993

[54] THERAPEUTIC DOLL AND METHOD OF OPERATION

[76] Inventor: Joan Friedel, 219 Northway, Baltimore, Md. 21218

[*] Notice: The portion of the term of this patent subsequent to Mar. 10, 2009 has been disclaimed.

[21] Appl. No.: 827,316

[22] Filed: Jan. 29, 1992

Related U.S. Application Data

[63] Continuation of Ser. No. 669,625, Mar. 14, 1991, Pat. No. 5,094,621.

[51] Int. Cl.⁵ .................. G09B 19/00; A63H 3/00
[52] U.S. Cl. .................. 434/236; 446/268
[58] Field of Search .......... 446/268, 485, 73, 219, 446/297, 369, 72, 74, 303, 304; 434/236, 262

[56] References Cited

U.S. PATENT DOCUMENTS

| | | | |
|---|---|---|---|
| 2,619,771 | 12/1952 | Jones . | |
| 2,631,408 | 3/1953 | Henry | 446/304 |
| 3,791,068 | 2/1974 | Pietrowiak | 446/485 X |
| 4,516,950 | 5/1985 | Berman et al. | 446/297 |
| 4,573,927 | 3/1986 | Neuman | 434/236 |
| 4,645,470 | 2/1987 | Benton | 446/73 |
| 4,710,145 | 12/1987 | Vandis | 434/236 X |
| 4,737,131 | 4/1988 | Sirota | 446/485 X |
| 4,762,494 | 8/1988 | Woods | 434/236 |
| 4,917,607 | 4/1990 | Van Hoose | 434/236 |

FOREIGN PATENT DOCUMENTS 84059 12/1895 Fed. Rep. of Germany ........ 446/73

Primary Examiner—Mickey Yu
Attorney, Agent, or Firm—Diller, Ramik & Wight

[57] ABSTRACT

A therapeutic doll for self-help that can be used outside of a therapeutic or self-help session. The doll includes a heart area which can be illuminated and a speech-producing device which outputs encouraging messages. The doll also includes a variety of icons, such as a liquor bottle or pill bottle, which symbolize personal vices. The doll includes a shelf inside its cavity for placement of these icons. Use of the doll encourages the user to confront his or her problems and abstain from using liquor, drugs, etc.

23 Claims, 4 Drawing Sheets

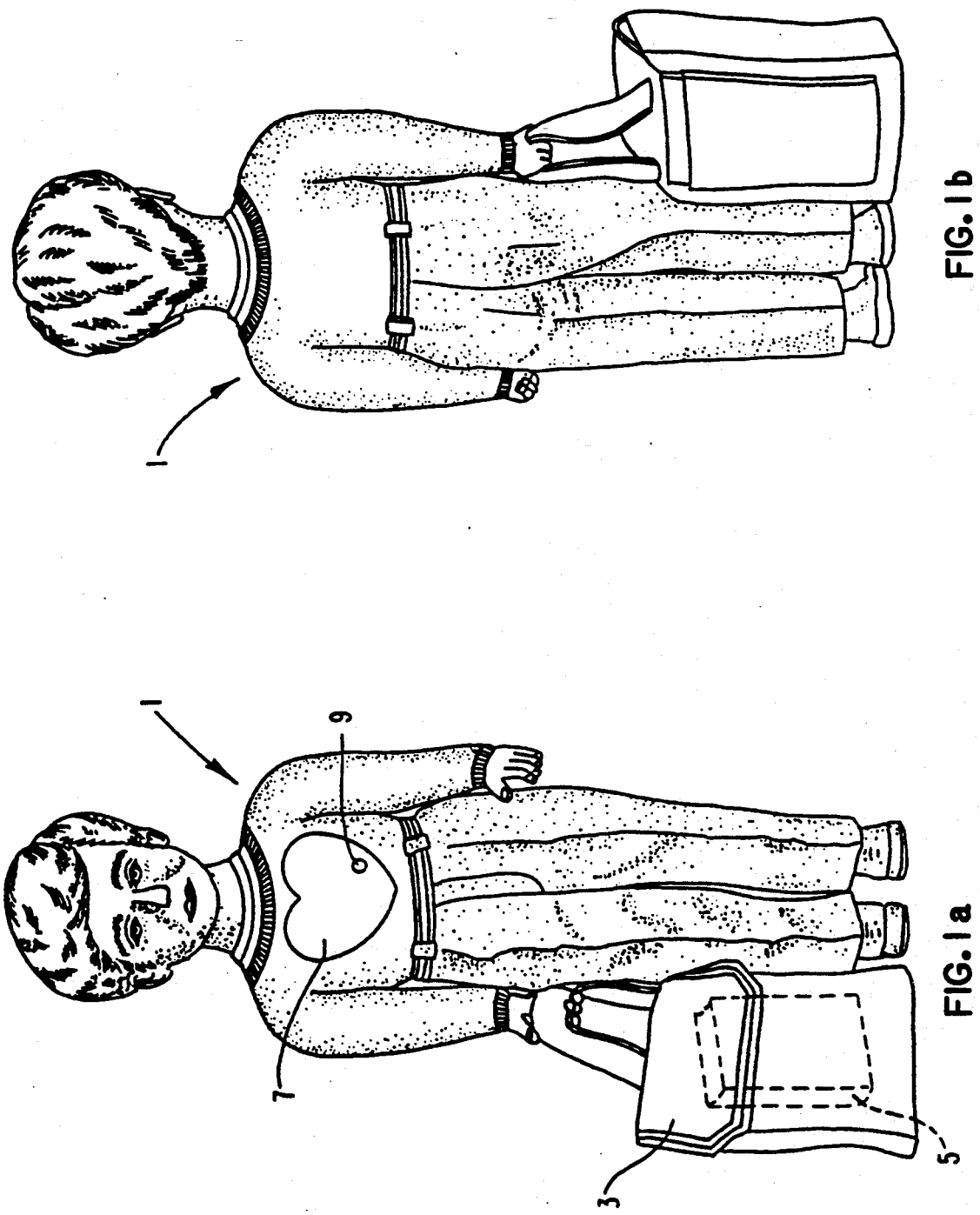

THERAPEUTIC DOLL AND METHOD OF OPERATION

This application is a continuation of application Ser. No. 07/669,625, filed Mar. 14, 1991, and now U.S. Pat. No. 5,094,621.

BACKGROUND OF THE INVENTION

The present invention relates to a therapeutic doll for use by a patient or the like, and more particularly, to a therapeutic doll including a cavity for storing icons and which includes features for dissuading a person from practicing his or her vice.

Addictions, including chemical dependency, afflict many people in our society. One of the most common procedures for curing someone with an addiction is through self-help groups. It has been shown that talking about one's problems with others helps a person to cope with the physical suffering that accompanies an addiction such as chemical dependency. Such self-help groups have also been employed as therapy for other psychological maladies. Unfortunately, a person will spend more time outside of group therapy, away from the support of his or her peers. Therefore, there is a need for a method and device that allows a person to receive therapy away from the self-help group.

In U.S. Pat. No. 4,762,494, a psychotherapy doll is described. The doll includes several hook and pile attachment areas for attaching items that include eyebrows, tears, a smile and others. The patient that uses this doll is better able to show personal feelings by expressing those feelings through the doll.

In U.S. Pat. No. 4,917,607, a therapeutic doll is described. This rag-type doll includes a plurality of fabric forms that denote human feelings (e.g., hearts, light bulbs, stars, etc.). These forms are inserted into appropriate areas by the patient to show where these feelings are experienced. By using this doll the user is better able to communicate with a therapist.

In U.S. Pat. No. 4,710,145, another therapeutic doll is described. This doll includes a tape recording device that records and plays back vocal messages. The use of this doll assists in communications between the therapist and his or her patient.

U.S. Pat. No. 4,645,470 describes a doll having a concealed pocket. The user of the doll is able to communicate thoughts and feelings by placing items such as written notes into the hidden pocket.

The aforementioned dolls deal specifically with communications between the patient and the therapist. These dolls, however, do not deal with personal therapy where a patient is able to treat his or her mental ailment without the assistance of a therapist or a self-help group (or in addition to this type of help or between visits). Thus, there is a need for a therapeutic device which allows a patient to obtain benefit from therapy without outside personal assistance.

SUMMARY OF THE INVENTION

This and other needs are satisfied by the therapeutic doll of the present invention. In a first embodiment, the doll includes a translucent area, such as a heart, in its outer surface. The translucent area is illuminated upon pressing a push-button mechanism. The doll also includes a knapsack that holds a book or the like. This book contains legible material such as affirmations, prayers, sayings, thoughts, needs, witticisms, suggestions, and the like.. A speech-producing device can also be provided which is coupled to the push-button mechanism.

In a second embodiment of the present invention, the doll includes a cavity- incorporated in its torso. The cavity includes a shelf for the placement of a variety of icons. These icons represent personal temptations. Upon depressing a push-button switch, the shelf collapses and icons originally placed on the shelf fall through a hollow portion of a leg of the doll into an attached knapsack. A small replica of the therapeutic doll is provided to be carried by the user when separated from the doll. This replica reminds the user of the larger doll. The replica may also be a doll in the form of a baby to remind the user of an inner child, discussed below. The doll of the second embodiment can also include a translucent area for illumination as well as a speech device. The back wall of the cavity can be decorated, especially with a depiction of a small child. The back wall may include tiny perforations that are illuminated from behind the wall.

The method of the present invention for operating such a doll includes placing one or more icons onto the shelf in the cavity. Because of the decoration in the cavity, the user may be dissuaded from conducting his or her vice. After closing a hatch over the cavity, the user presses a push-button mechanism causing the icons to return back to knapsack located next to a leg of the doll. The illuminated translucent area, vocal communication, and overall decoration of the doll encourage the user to cope with his or her problem.

Other features, advantages and embodiments of the invention will be apparent to those skilled in the art from the following description, accompanying drawings and appended claims.

BRIEF DESCRIPTION OF THE DRAWINGS

FIGS. 1a–b are front and rear views of a doll constructed according to a first embodiment of the present invention.

DETAILED DESCRIPTION

Figure 2B:
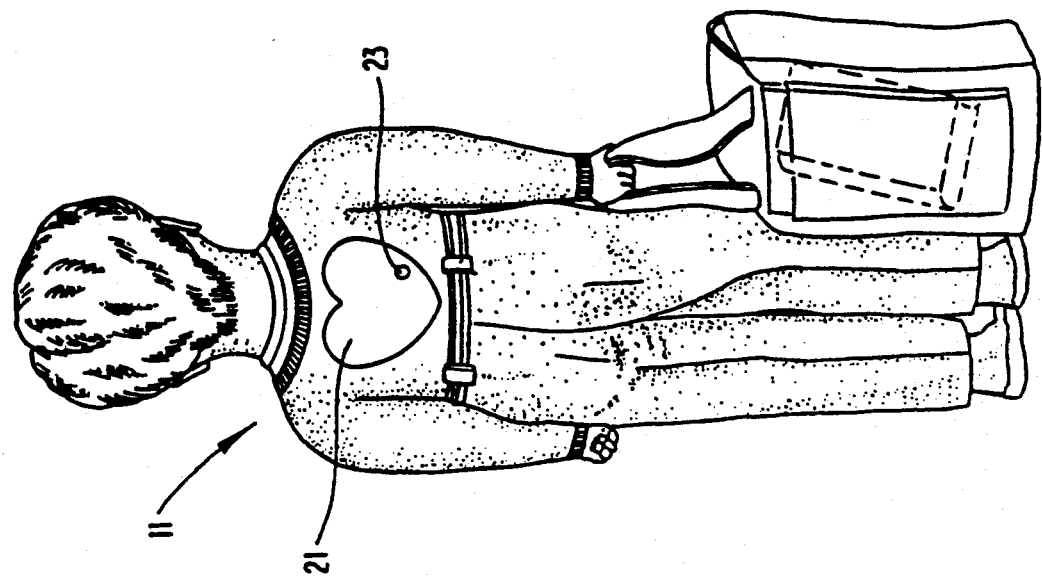
FIGS. 2a, 2c and 2b, 2d are respective front and rear views of a doll constructed according to a second embodiment of the present invention.

Referring to FIG. 1, a first embodiment of the doll of the present invention is shown. The doll 1 has human features such as skin color and sex. It is of an advantage if the doll 1 resembles the user so that the user will identify with the doll 1. The doll 1 includes a knapsack 3 which holds items such as a book 5. This book can contain instructional material for the user such as a book of affirmations. The doll 1 also includes a heart area 7 and push-button mechanism 9. When the push-button mechanism 9 is depressed a speech-producing device, such as a voice synthesizing chip (not shown), outputs a vocal message. The programming of a voice synthesizing is well known to one of ordinary skill in the art. The vocal communication can be any of a variety of prayers, affirmations, suggestions, etc. For instance, depression of the push-button mechanism 9 could cause the voice synthesizing chip to output the Serenity Prayer: "God grant me the serenity to accept the things I cannot change, courage to change the things I can, and the wisdom to know the difference." In a further example, the voice synthesizing chip could output vocal communications as if they are coming from the "inner child" of the user or the doll. Therefore, the user is able to orally communicate with his or her "inner child". The heart area 7 can also be translucent, such that a light (not shown) within the doll 1 illuminates the heart area 7 when the push-button mechanism 9 is depressed.

Figure 2A:
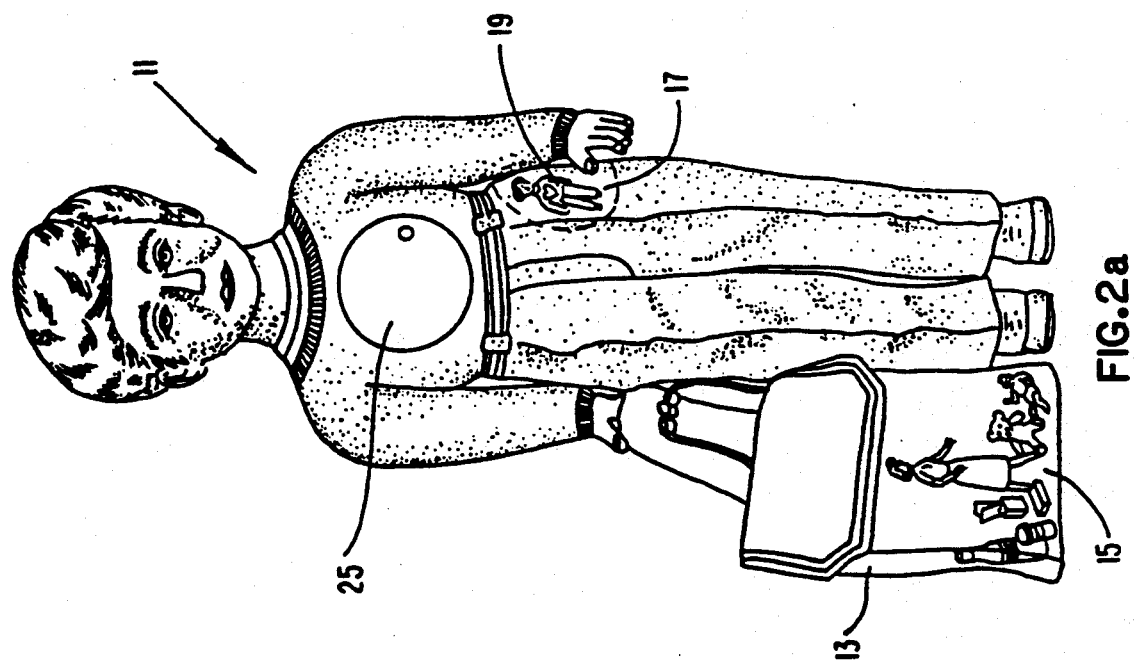

Referring to FIGS. 2a-2d, a doll constructed according to a second embodiment of the present invention is shown. This doll 11 also includes a knapsack 13 which carries a plurality of icons shown generally as 15. As seen in FIG. 2a, the doll 11 includes a front pocket 17 which can hold any of a variety of items including a miniature doll 19 which is a smaller version of the doll 11 of the present invention. This miniature doll 19 can be carried by the user separately from the therapeutic doll 11 and serves as a good luck charm, reminding the owner of the doll 11.

Figure 2D:
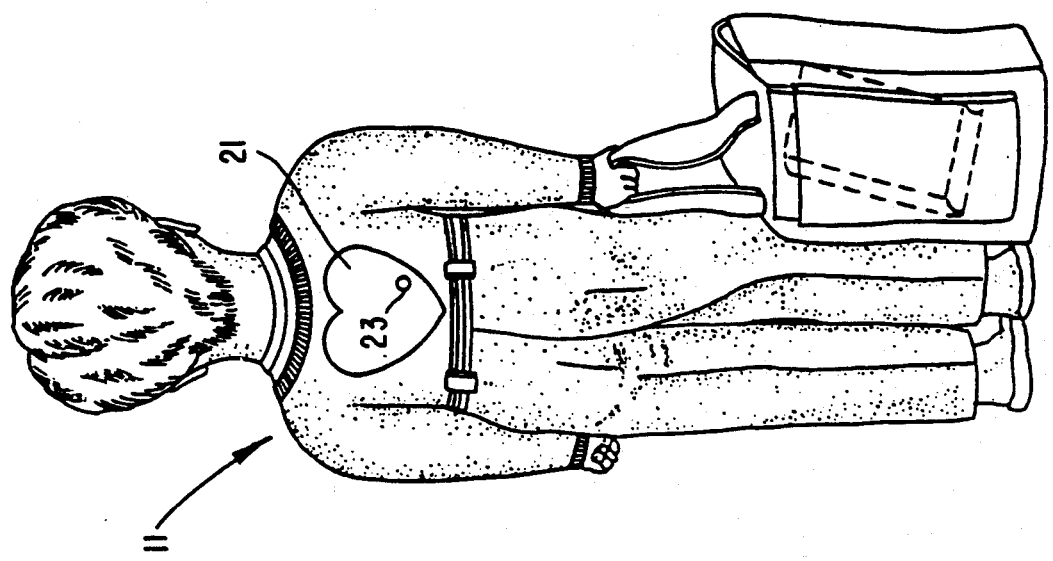

As seen in FIGS. 2b and 2d, the doll 11 includes a back heart area 21 and a back push-button mechanism 23. Operation of the heart area 21 and push-button mechanism 23 is similar to the corresponding items of FIG. 1. As seen in FIGS. 2a and 2b, the doll 11 includes a front hatch 25 which protects an inner cavity.

Figure 2C:
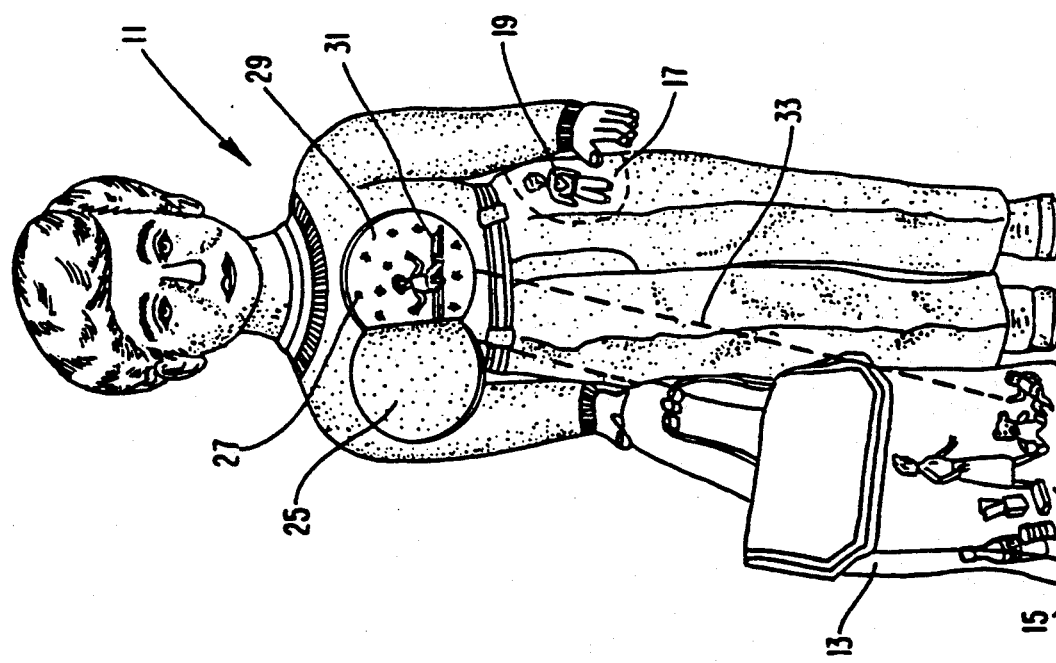

Referring to FIG. 2c, the cavity of the doll 11 and its operation are shown. The front hatch 25 opens to reveal a cavity 27. The cavity 27 includes a back wall which can be decorated. As seen in FIG. 2c, the back wall 29 is decorated with a small child and stars. The inner cavity also includes a small shelf 31. Any of the icons 15 can be placed on the shelf 31 The user places one or more of the icons 15 onto the shelf 31 and closes the front hatch 25. The user can then turn the doll 11 over and depress the push-button mechanism 23. Depression of push-button 23 releases the shelf 31, causing the icons to fall. The cavity 27 is coupled to a hollow portion 33 in the leg area of the doll 11. This hollow portion 33 opens into the knapsack 13. Thus, the icons return to the knapsack after push-button 23 is depressed. As in the doll of FIG. 1, a speech-producing device such as a voice synthesizing chip can output a vocal message upon depression of the push-button mechanism 23. Also, the heart area 21 can be illuminated. By replacing the shelf to its original position, the voice synthesizing chip automatically turns off. In addition, the illumination of the heart area 21 could also be used to light up small pinholes in the back wall 29 of the cavity 27 to display a message, such as "LOVE".

Figure 3:
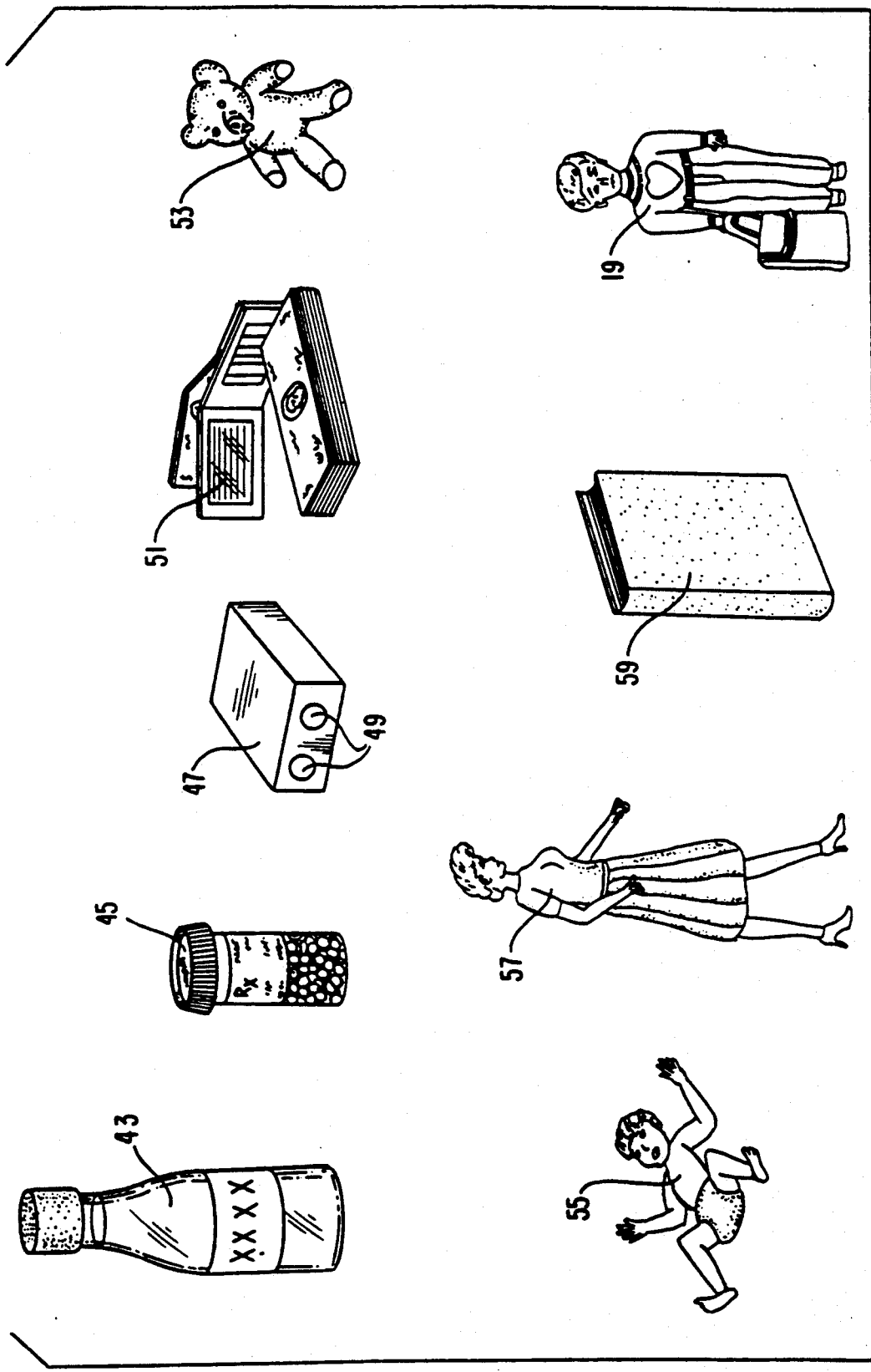
FIG. 3 is a schematic diagram of icons and accessories for the doll of FIGS. 2a–2d.

Referring to FIG. 3, sample icons and accessories of the doll of the present invention are shown. The icons 41 represent personal temptations and include a variety of figures such as: a plastic liquor bottle 43, a plastic pill jar 45, a cardboard candy box 47 with plastic candies 49, a paper bank envelope 51 (which includes play money), a teddy bear 53, a baby doll 55, a parent doll 57, a book of affirmations 59, and the replica doll 19 The baby doll 55 can also substitute as an inner child to be carried by the user. The book of affirmations is described above with reference to FIG. 1.

In operation, the user is encouraged to identify with the doll. In other words the doll is to represent the user. By playing a message, such as the Serenity Prayer, the doll encourages the user to restrain himself from using drugs or the like. The tiny stars appearing on the back wall of the cavity esoterically show man's relationship to the universe or God. The user is encouraged to get in touch with what has been referred to in psychiatric literature as the "inner child", and enables him to do inner child work with items such as the teddy bear and parental doll. More importantly, the user may think twice about giving things such as liquor, drugs, candy, or money to the small child appearing in the cavity of the doll. Therefore, the therapeutic doll of the present invention encourages the user to give up his or her vice.

The inner child painted in the cavity represents the childhood past of the participating adult. The adult can orally talk to his inner child and allow the child to make his or her needs known. The adult can finally take care of his neglected inadequate, lonely, abused, unloved, unwanted, or shamed self that still operates as a child by getting in touch with his past memories, feelings and experiences. By nurturing this wounded child, an inner strength develops allowing a healing of the body mind and spirit in the now grown adult. Further information on the inner child theory can be found in *Homecoming: Reclaiming and Championing Your Inner Child* by John Bradshaw and *Healing Your Aloneness: Finding Love and Wholeness Through Your Inner Child* by Erika J. Chopich and Margaret Paul.

The above is a detailed description of particular embodiments of the invention. The full scope of the invention is set out in the claims that follow and their equivalents. Accordingly, the claims and specification should not be construed to unduly narrow the full scope of protection to which the invention is entitled.

What is claimed is:

1. A therapeutic doll comprising a body having a head; a torso having an outer surface, two arms and two legs, a cavity within said torso, means for opening and closing a portion of said torso to access said cavity, a shelf disposed within said cavity, a translucent area defined by at least a portion of the outer surface of said torso, means within said torso for illuminating said translucent area, and means for activating said illuminating means to illuminate said translucent area.

2. The therapeutic doll as defined in claim 1 wherein said translucent area is heart-shaped.

3. The therapeutic doll as defined in claim 1 including speech-producing means disposed within said body and coupled to said activating means whereby activation of said activating means causes said speech-producing means to output a vocal communication.

4. The therapeutic doll as defined in claim 2 including speech-producing means disposed within said body and coupled to said activating means whereby activation of said activation means causes said speech-producing means to output a vocal communication.

5. The therapeutic doll as defined in claim 1 including a knapsack removably coupled to said doll, a miniature book having legible material thereon, and said book being of a sufficient size to fit in said knapsack.

6. A therapeutic doll comprising a body having a head; a torso having an outer surface, two arms, a first leg and a second leg; one of said first and second legs having a hollow portion, a cavity within said torso, said cavity being in communication with the hollow portion of said one leg, a hatch defined by a portion of said torso which when opened effects access to said cavity, and a shelf housed in said cavity.

7. The therapeutic doll as defined in claim 6 including a knapsack having at least one opening, and said knapsack being removably coupled to said doll in communication with the hollow portion of said one leg.

8. The therapeutic doll as defined in claim 7 including a plurality of icons of a size to fit in said knapsack and on said shelf.

9. The therapeutic doll as defined in claim 8 including a push-button means coupled to said shelf and said therapeutic doll for collapsing said shelf such that any of said icons present on said shelf fall off of said shelf and travel through the hollow portion of said one leg to said knapsack.

10. The therapeutic doll as defined in claim 9 including a translucent area incorporated into a surface of said torso, and illumination means within said torso and behind said translucent area for activation by said push-button means to cause said illumination means to illuminate said translucent area.

11. The therapeutic doll as defined in claim 10 wherein said translucent area is heart-shaped.

12. The therapeutic doll as defined in claim 9 including speech-producing means disposed within said body and coupled to said activating means whereby activation of said activating means causes said speech-producing means to output a vocal communication.

13. The therapeutic doll as defined in claim 9 wherein a wall of said cavity is decorated with stars and a small child.

14. The therapeutic doll as defined in claim 9 wherein a wall of said cavity includes a plurality of holes, illumination means within said body and behind said wall of said cavity whereby activation of said activating means causes said illumination means to illuminate said plurality of holes.

15. The therapeutic doll as defined in claim 9 wherein said plurality of holes forms a legible message.

16. The therapeutic doll as defined in claim 6 including a garment upon said therapeutic doll, said garment including a pocket, and a smaller replica of said therapeutic doll of sufficient size to fit in the pocket of said garment.

17. A therapeutic doll comprising a doll body, a cavity in said doll body, hatch means for accessing said cavity, a shelf in said cavity, at least one icon upon said shelf and at least one hollow leg beneath said cavity, and means for collapsing said shelf whereby said icon falls through said cavity and into said hollow leg.

18. The therapeutic doll as defined in claim 17 including means for defining a translucent area of said body and means for illuminating said translucent area.

19. The therapeutic doll as defined in claim 17 including speech-producing means for producing vocal communication substantially contemporaneously with the operation of said illuminating means.

20. A method of operating a therapeutic doll comprising the steps of opening a hatch to reveal a cavity in said doll, placing at least one icon which represents a personal vice on a shelf within said cavity, closing said hatch, and collapsing said shelf such that said icon falls through said cavity and into a hollow portion of a leg of said therapeutic doll.

21. The method as defined in claim 20 including the step of transmitting a vocal communication substantially contemporaneously with the collapse of said shelf.

22. The method as defined in claim 20 including the step of illuminating a translucent area of said therapeutic doll substantially contemporaneously with the collapse of said shelf.

23. The method as defined in claim 21 including the step of illuminating a translucent area of said therapeutic doll substantially contemporaneously with the collapse of said shelf.

* * * * *